(12) United States Patent
Yamazoe

(10) Patent No.: US 11,167,599 B2
(45) Date of Patent: Nov. 9, 2021

(54) TIRE FOR MOTORCYCLE FOR UNEVEN GROUND TRAVELING

(71) Applicant: SUMITOMO RUBBER INDUSTRIES, LTD., Hyogo (JP)

(72) Inventor: Shohei Yamazoe, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 207 days.

(21) Appl. No.: 16/389,988

(22) Filed: Apr. 21, 2019

(65) Prior Publication Data

US 2019/0351713 A1  Nov. 21, 2019

(30) Foreign Application Priority Data

May 15, 2018  (JP) .............................. JP2018-093968

(51) Int. Cl.
*B60C 11/11* (2006.01)
*B60C 11/03* (2006.01)

(52) U.S. Cl.
CPC .......... *B60C 11/11* (2013.01); *B60C 11/0302* (2013.01); *B60C 2200/10* (2013.01); *B60C 2200/14* (2013.01)

(58) Field of Classification Search
None
See application file for complete search history.

(56) References Cited

U.S. PATENT DOCUMENTS

D865,650 S * 11/2019 Yamazoe ................ B60C 11/11
D12/536
2012/0018067 A1* 1/2012 Hikita ..................... B60C 11/11
152/209.8
2012/0305154 A1* 12/2012 Hikita ..................... B60C 11/11
152/209.11
2012/0312436 A1* 12/2012 Hikita .................... B60C 11/032
152/209.1
2016/0016437 A1* 1/2016 Ito .......................... B60C 11/11
152/209.15

FOREIGN PATENT DOCUMENTS

| EP | 2529954 | 12/2012 |
| EP | 3323640 | 5/2018 |
| JP | 2012136186 | 7/2012 |

OTHER PUBLICATIONS

"Search Report of Europe Counterpart Application", dated Sep. 18, 2019, p. 1-p. 7.

* cited by examiner

*Primary Examiner* — Marc C Howell
*Assistant Examiner* — John J DeRusso
(74) *Attorney, Agent, or Firm* — JCIPRNET

(57) ABSTRACT

Provided is a tire for a motorcycle for uneven ground traveling capable of continuously exhibiting good grip performance. The tire for a motorcycle for uneven ground traveling includes a tread part on which plural crown blocks are formed, and at least one of the crown block has a wheel tread, a first side surface, a first edge arranged between the wheel tread and the first side surface, a concave part that opens on the wheel tread and the first side surface, and a second edge arranged between the wheel tread and the concave part. The wheel tread has at least one external corner part in which an angle between the first edge and the second edge is an acute angle.

16 Claims, 6 Drawing Sheets

TIRE FOR MOTORCYCLE FOR UNEVEN GROUND TRAVELING

CROSS REFERENCE TO RELATED APPLICATIONS

This application claims the priority benefit of Japanese Patent Application No. 2018-093968, filed on May 15, 2018. The entirety of the above-mentioned patent application is hereby incorporated by reference herein and made a part of this specification.

BACKGROUND

Technical Field

The disclosure relates to a tire having crown blocks for a motorcycle for uneven ground traveling.

Description of Related Art

Patent Document 1 (Japanese Patent Laid-Open No. 2012-136186) discloses a tire for a motorcycle for uneven ground traveling that slits are arranged in crown blocks in order to increase grip performance on uneven ground.

However, in the tire described in Patent Document 1, there is a tendency for soil or mud to clog the slits and this state persists during uneven ground traveling. Accordingly, it is difficult to keep a grip performance on uneven ground for a long time.

SUMMARY

In view of the above description, the disclosure provides a tire for a motorcycle for uneven ground traveling capable of continuously exhibiting good grip performance.

According to the disclosure, a tire for a motorcycle for uneven ground traveling includes a tread part, on which a plurality of crown blocks are formed. At least one of the crown blocks has a wheel tread, a first side surface disposed at one side of the wheel tread in a tire circumferential direction, a first edge arranged between the wheel tread and the first side surface, a concave part that opens on the wheel tread and the first side surface, and a second edge arranged between the wheel tread and the concave part. The wheel tread has at least one external corner part in which an angle between the first edge and the second edge is an acute angle.

In the tire for a motorcycle for uneven ground traveling of the disclosure, the first side surface may be curved to be recessed toward the other side in the tire circumferential direction in a plan view of a tread.

In the tire for a motorcycle for uneven ground traveling of the disclosure, the crown block may have a second side surface disposed on the other side of the wheel tread in the tire circumferential direction, and the concave part may also open on the second side surface.

In the tire for a motorcycle for uneven ground traveling of the disclosure, the second side surface may be curved to be recessed toward one side in the tire circumferential direction in the plan view of the tread.

In the tire for a motorcycle for uneven ground traveling of the disclosure, a width of the concave part on the second side surface in a tire axis direction may be larger than a width of the concave part on the first side surface in the tire axis direction.

In the tire for a motorcycle for uneven ground traveling of the disclosure, once a rotational direction of the tire is specified, and the first side surface may be disposed on a last-landing side of the wheel tread in the rotational direction.

In the tire for a motorcycle for uneven ground traveling of the disclosure, the wheel tread may include a first surface and a second surface separated from each other by the concave part, and at least one of the first surface and the second surface may be surrounded by a hexagonal edge.

In the tire for a motorcycle for uneven ground traveling of the disclosure, the hexagonal edge may have a minimum edge length that is 0.15 times or more a maximum edge length.

In the tire for a motorcycle for uneven ground traveling of the disclosure, the angle may be 80° or more.

In the tire for a motorcycle for uneven ground traveling of the disclosure, a depth of the concave part may be 0.10 to 0.80 times a height of the crown block.

In the tire for a motorcycle for uneven ground traveling of the disclosure, at least one of the crown blocks has a wheel tread, a first side surface disposed at one side of the wheel tread in the tire circumferential direction, a first edge arranged between the wheel tread and the first side surface, a concave part that opens on the wheel tread and the first side surface, and a second edge arranged between the wheel tread and the concave part. The concave part serves to make the crown block cut into a road surface more easily during uneven ground traveling. In addition, the concave part provides a large reaction force by shearing soil or mud that is pressed thereinto. Accordingly, the tire of the disclosure can exhibit good grip performance.

The wheel tread of the crown block has at least one external corner part in which an angle between the first edge and the second edge is an acute angle. The external corner part generates appropriate elastic deformation and facilitates discharge of soil or mud in the concave part during uneven ground traveling. Accordingly, mud or the like can be prevented from remaining in the concave part for a long time. Accordingly, the tire for a motorcycle for uneven ground traveling of the disclosure can continuously exhibit good grip performance.

DESCRIPTION OF THE EMBODIMENTS

Figure 1:
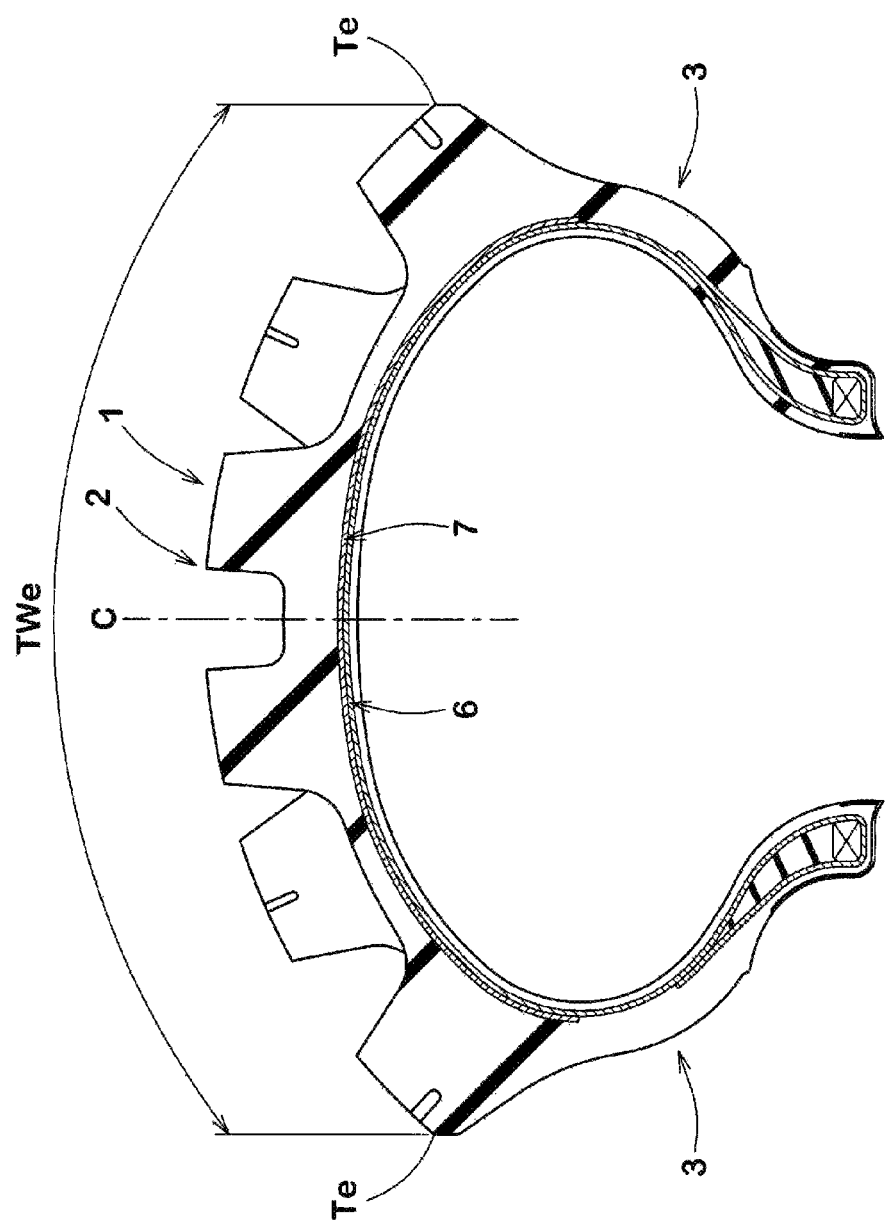
FIG. 1 is a lateral cross-sectional view showing an embodiment of a tire for uneven ground traveling of the disclosure.
Figure 2:
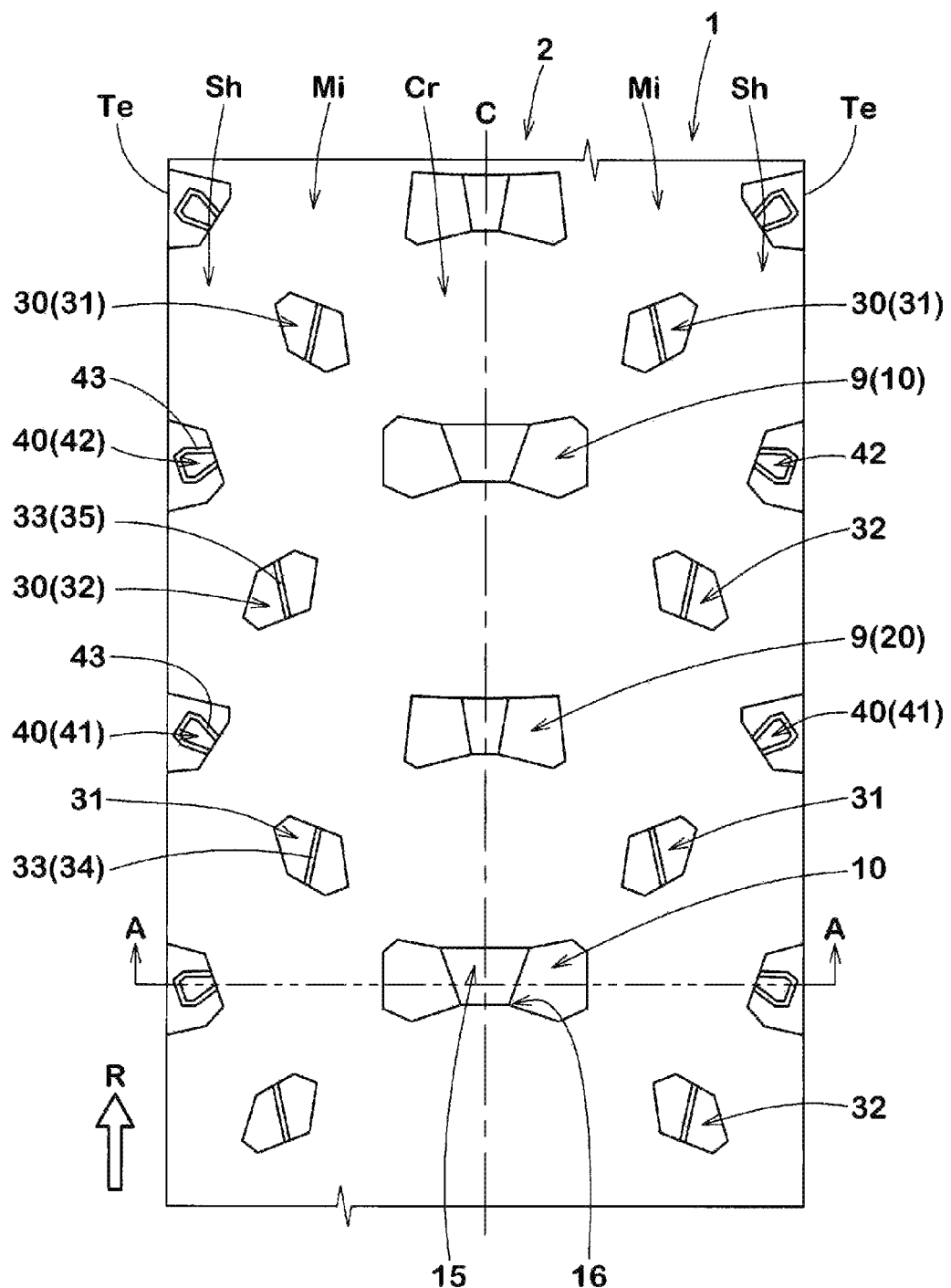
FIG. 2 is a development view showing a tread pattern of a tread part in FIG. 1.

Hereinafter, an embodiment of the disclosure will be described with reference to the accompanying drawings. FIG. 1 shows a lateral cross-sectional view in a normal state of a tire for a motorcycle for uneven ground traveling (hereinafter, simply referred to as "a tire") 1 according to an embodiment of the disclosure. FIG. 2 is a development view showing a tread pattern of a tread part 2 of the tire 1. FIG. 1 is a cross-sectional view taken along line A-A in FIG. 2.

The "normal state" is a state of no load that the tire 1 is assembled to a normal rim (not shown) and filled with air at a normal internal pressure. Dimensions of parts of the tire 1 are values measured in a normal state unless the context clearly indicates otherwise.

The "normal rim" is a standard rim specified for tires in a standard system including the standard on which the tire is based, for example, "a standard rim" in JATMA, "a design rim" in TRA, and "a measuring rim" in ETRTO.

The "normal internal pressure" is a pneumatic pressure that each standard specifies tires in a standard system including the standard on which the tire is based, and the pressure is "a highest pneumatic pressure" in JATMA, a maximum value disclosed in the Table "TIRE LOAD LIMITS AT VARIOUS COLD INFLATION PRESSURES" in TRA, and "INFLATION PRESSURE" in ETRTO.

As shown in FIG. 1, for example, the tire 1 of the disclosure is appropriately used as a tire for a motorcross race. The tire of the embodiment is appropriately used as, for example, a tire for a front wheel of a motorcross vehicle. However, it is not limited to such a configuration. The tread part 2 of the tire 1 of the embodiment has an outer surface that is curved in an arc shape protruding outward in a tire radial direction in a lateral cross section.

The tire 1 of the embodiment includes, for example, a carcass 6 and a belt layer 7. Known configurations are appropriately employed for these.

As shown in FIG. 2, the tread part 2 includes a directional pattern that a rotational direction R is designated. The rotational direction R is marked on a sidewall part 3 (shown in FIG. 1) using, for example, a character or a symbol.

The tread part 2 is divided into, for example, a crown region Cr, middle regions Mi and shoulder regions Sh.

The crown region Cr is a region having a width of ⅓ of a tread development width TWe (shown in FIG. 1, the same below) centered on a tire equatorial line C. Each of the shoulder regions Sh is a region having a width of ⅙ of the tread development width TWe from each of tread ends Te to the side of the tire equatorial line C. The middle regions Mi are regions between the crown region Cr and the shoulder regions Sh.

The tread development width TWe is a distance between the tread ends Te and Te in the tire axis direction when the tread part 2 is developed on a plane. The tread ends Te are outer edges in the tire axis direction of a block disposed at the outermost side in the tire axis direction in the blocks disposed on the tread part 2.

A plurality of crown blocks 9 are formed on the tread part 2. For example, the crown blocks 9 are positioned at a center of a figure of the wheel tread in the crown region Cr. In a preferred configuration, each of the crown blocks 9 is provided on the tire equatorial line C. The tread part 2 of the embodiment has a plurality of middle blocks 30 provided on the middle regions Mi, and shoulder blocks 40 provided on the shoulder regions Sh.

The crown blocks 9 include first crown blocks 10 and second crown blocks 20, both of which have different shapes. In the embodiment, the first crown blocks 10 and the second crown blocks 20 are provided alternately in the tire circumferential direction. However, the disclosure is not limited to the aforementioned configuration.

Figure 3:
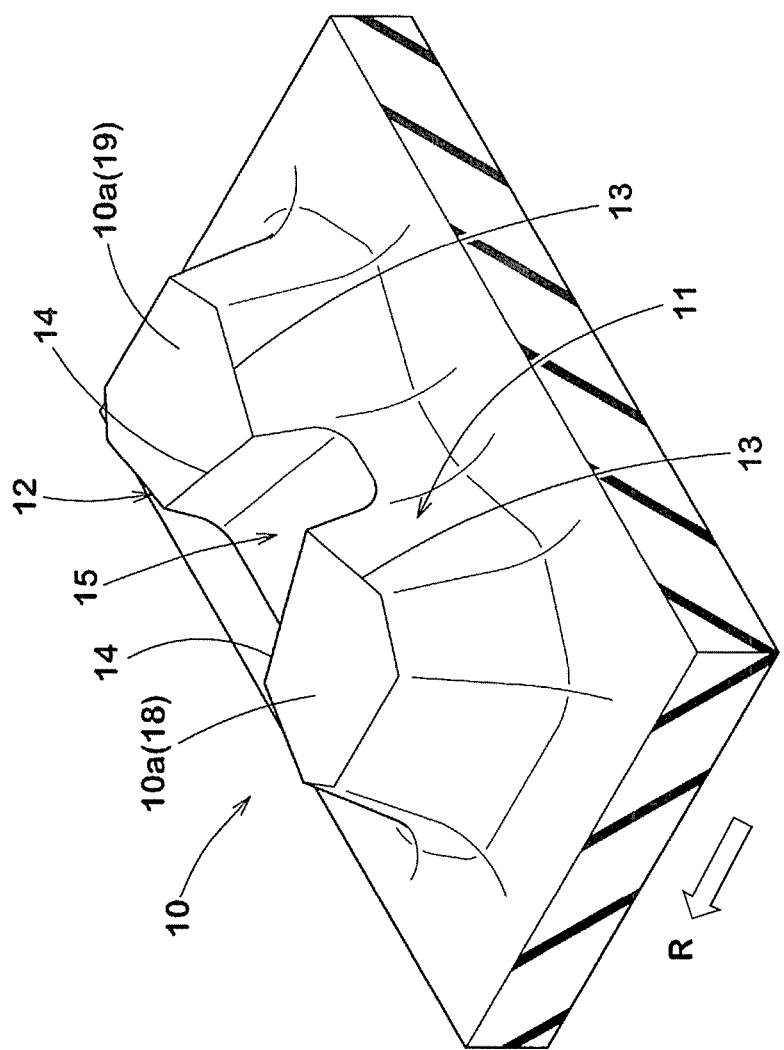
FIG. 3 is an enlarged perspective view of a first crown block in FIG. 2.

FIG. 3 shows an enlarged perspective view of one of the first crown blocks 10. As shown in FIG. 3, the first crown block 10 has a wheel tread 10a, a first side surface 11 disposed on one side of the wheel tread 10a in the tire circumferential direction, and a second side surface 12 disposed on the other side of the wheel tread 10a in the tire circumferential direction. In the embodiment, the first side surface 11 is disposed on a last-landing side of the wheel tread 10a in the rotational direction R. The second side surface 12 is disposed on a first-landing side of the wheel tread 10a in the rotational direction R.

The first crown block 10 has a first edge 13 between the wheel tread 10a and the first side surface 11, a concave part 15 that opens on the wheel tread 10a and the first side surface 11, and a second edge 14 between the wheel tread 10a and the concave part 15. The first crown blocks 10 of the embodiment have the two first edges 13 and the two second edges 14.

Figure 4A:
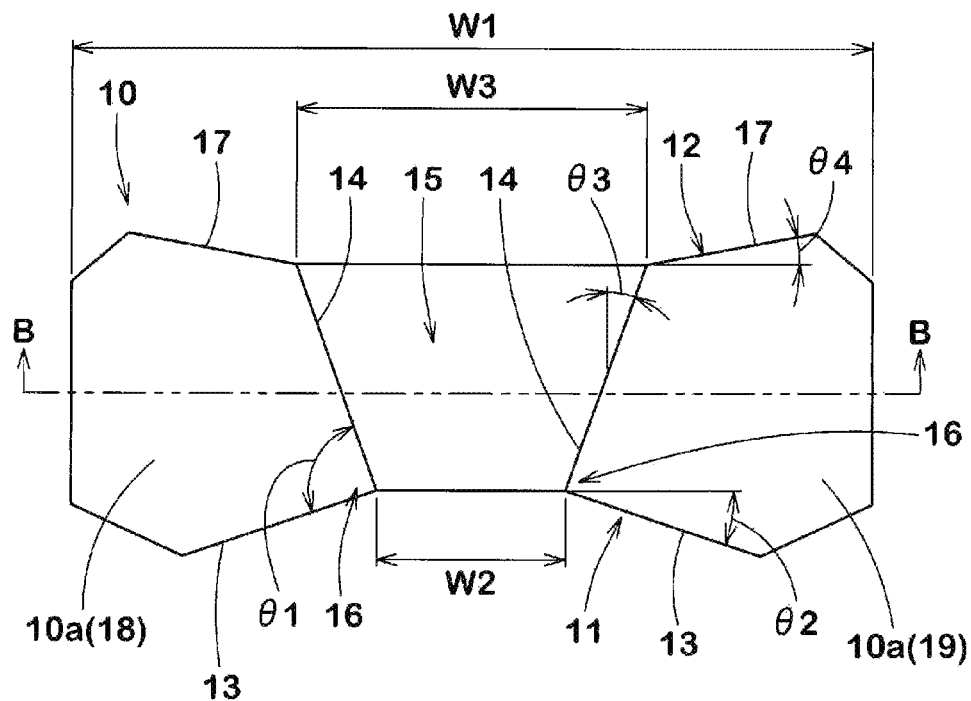
FIG. 4A is an enlarged plan view of the first crown block in FIG. 2.

FIG. 4A shows an enlarged plan view of a wheel tread of the first crown block 10. As shown in FIG. 4A, the wheel tread 10a of the first crown block 10 has at least one external corner part 16 in which an angle θ between the first edge 13 and the second edge 14 is an acute angle. In one preferred configuration, the wheel tread 10a of the first crown block 10 of the embodiment has two external corner parts 16.

The aforementioned external corner parts 16 generate appropriate elastic deformation and promote discharge of soil or mud in the concave part 15 during uneven ground traveling. Accordingly, the concave part 15 can prevent mud or the like from remaining for a long time. Therefore, the tire 1 of the disclosure can continuously exhibit good grip performance.

The angle θ1 is preferably 80° or more, and more preferably 85° or more. Accordingly, the above-mentioned effects can be obtained while preventing uneven wear of the external corner parts 16.

For example, the first side surface 11 is curved to be recessed toward the other side in the tire circumferential direction (in other words, the second side surface 12 side) when seen in a plan view of the tread. The first side surface 11 serves to increase a reaction force when the first crown blocks 10 push away soil. In the embodiment, since the first side surface 11 is disposed on the last-landing side of the wheel tread 10a in the rotational direction R, the brake performance is increased by the first side surface 11.

The two first edges 13 are continuous to one side or the other side of the concave part 15 in the tire axis direction. When seen in a plan view of the tread, the two first edges 13 extend linearly and are inclined in opposite directions. An angle θ2 of each of the first edges 13 with respect to the tire axis direction is preferably 60° or less, and more preferably 30° or less. More specifically, the angle θ2 is preferably 10 to 25°.

For example, the concave part 15 also opens on the second side surface 12. The concave part 15 can further suppress the soil or mud from clogging the inside.

A width W3 of the concave part 15 on the second side surface 12 in the tire axis direction is desirably larger than a width W2 of the concave part 15 on the first side surface 11 in the tire axis direction. Specifically, the width W3 of the concave part 15 on the second side surface 12 is desirably 1.5 to 2.0 times the width W2 of the concave part 15 on the first side surface 11 in the tire axis direction. The concave part 15 of the embodiment has a maximum width W3 on the second side surface 12. For example, the width W3 of the concave part 13 on the second side surface 12 in the tire axis direction is preferably 0.10 times or more, more preferably 0.40 times or more, and preferably 0.60 times or less, more preferably 0.50 times or less a maximum width W1 of the first crown block 10 in the tire axis direction. The concave part 15 can continuously exhibit good grip performance.

The width of the concave part 15 in the tire axis direction is preferably gradually increased from the first side surface 11 to the second side surface 12. In addition, an opening shape of the wheel tread 10a of the concave part 15 is a trapezoidal shape.

The two second edges 14 extend linearly. The angle $\theta 3$ of the second edges 14 with respect to the tire circumferential direction is preferably, for example, 45° or less. Specifically, the angle $\theta 3$ is 10 to 30°. The second edges 14 can increase grip performance while suppressing soil or mud from clogging the concave part 15 during uneven ground traveling.

Figure 4B:
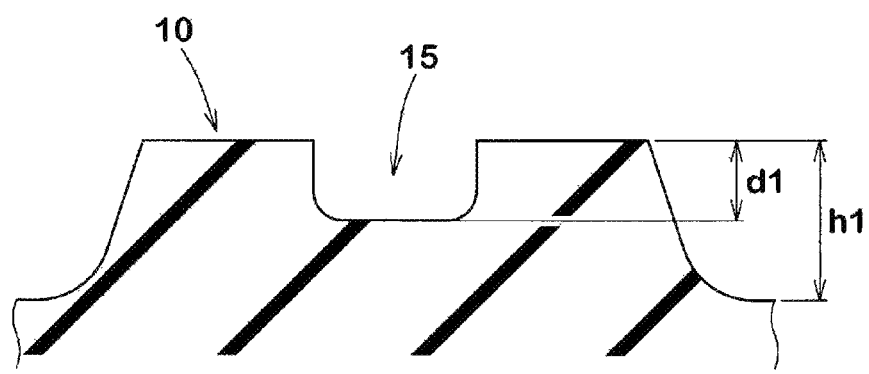
FIG. 4B is a cross-sectional view taken along line B-B in FIG. 4A.

FIG. 4B shows a cross-sectional view taken along line B-B of the first crown block 10. As shown in FIG. 4B, a depth d1 of the concave part 15 is smaller than a height h1 of the crown block 9. Accordingly, the first crown block 10 has a block piece on one side of the concave part 15 in the tire axis direction and a block piece on the other side of the concave part 15 in the tire axis direction, which are integrally connected to each other by a rubber portion inside the concave part 15 in the tire radial direction. The depth d1 of the concave part 15 is preferably 0.10 times or more, more preferably 0.30 times or more, and preferably 0.80 times or less, more preferably 0.50 times or less the height h1 of the crown block 9. The concave part 15 can exhibit good grip performance for a long time.

In a lateral cross section that a width of the concave part 15 in the tire axis direction is a medium value between a maximum value and a minimum value, a ratio S2/S1 of a cross-sectional area S2 of the concave part 15 with respect to a cross-sectional area S1 of the rubber portion of the first crown blocks 10 is preferably 0.04 to 0.25, more preferably 0.10 to 0.20. The concave part 15 can easily discharge soil or mud while maintaining rigidity of the block.

From the same viewpoint, when the lateral cross section of the first crown block 10 is moved in the tire circumferential direction, a ratio Rmin/Rmax between a minimum value Rmin of the ratio S2/S1 and a maximum value Rmax of the ratio S2/S1 is preferably 0.20 to 1.00, more preferably 0.30 to 0.70. Further, in the embodiment, the ratio S2/S1 at an end portion of the concave part 15 on the last-landing side in the rotational direction R becomes the minimum value Rmin, and the ratio S2/S1 at an end portion of the concave part 15 on the first-landing side in the rotational direction R becomes the maximum value Rmax.

As shown FIG. 4A, for example, the second side surface 12 is curved to be recessed toward one side in the tire circumferential direction (in other words, the first side surface 11 side) in a plan view of the tread. The second side surface 12 serves to increase a reaction force when the first crown blocks 10 push away soil. In the embodiment, since the second side surface 12 is disposed on the first-landing side of the wheel tread 10a in the rotational direction R, traction performance is increased by the second side surface 12.

Two third edges 17 between the wheel tread 10a and the second side surface 12 are included in the first crown blocks 10. The two third edges 17 are respectively continuous to one side or the other side of the concave part 15 in the tire axis direction. In a plan view of the tread, the two third edges 17 extend linearly and are inclined in opposite directions. An angle $\theta 4$ of each third edges 17 with respect to the tire axis direction is preferably 50° or less, more preferably 20° or less. More specifically, the angle $\theta 4$ is 5 to 15°. In a more preferable state, the angle $\theta 4$ of the third edges 17 is preferably smaller than the angle $\theta 2$ of the first edges 13 with respect to the tire axis direction. The third edges 17 can continuously exhibit good traction performance while suppressing clogging of soil on the second side surface 12 side of the first crown blocks 10.

The wheel tread 10a of the first crown block 10 has a first surface 18 and a second surface 19 separated from each other by the concave part 15. At least one of the first surface 18 and the second surface 19 is preferably surrounded by a hexagonal edge. In the embodiment, both of the first surface 18 and the second surface 19 are surrounded by a hexagonal edge. In a more preferable aspect, the first surface 18 and the second surface 19 are line-symmetrical with respect to a virtual line extending in the tire circumferential direction through the concave part 15. Such a wheel tread can suppress local deformation of the first surface 18 and the second surface 19 and uneven wear thereof. In addition, the block having such a wheel tread does not change an amount of deformation much for stress in either direction, and a linear operation feeling can be provided during uneven ground traveling.

In order to further exhibit the above effects, in the hexagonal edge, a minimum edge length of one side is preferably 0.15 times or more a maximum edge length.

Figure 5:
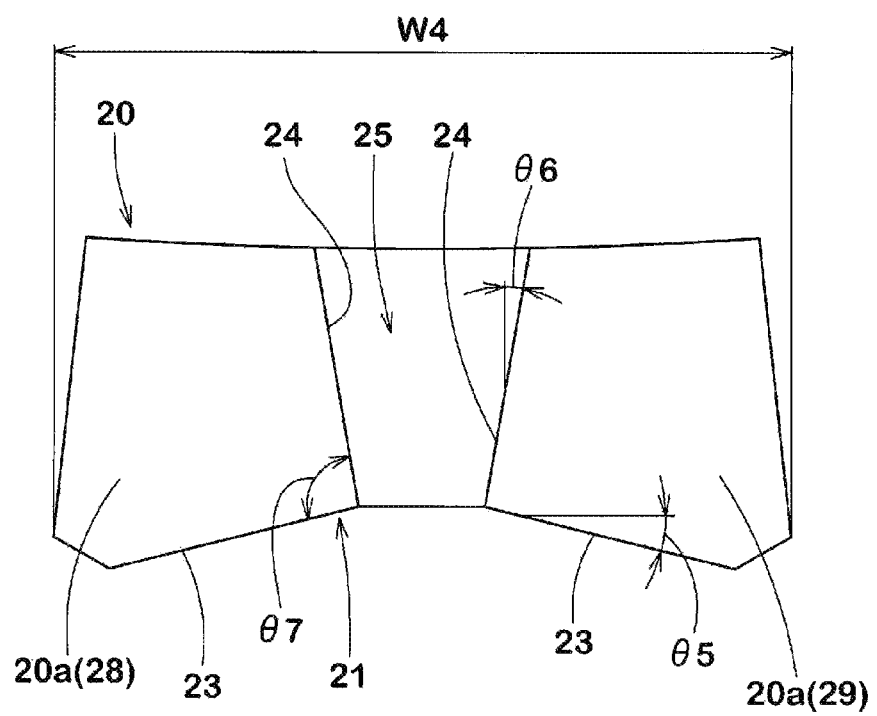
FIG. 5 is an enlarged plan view of a second crown block in FIG. 2.

FIG. 5 shows an enlarged plan view of the second crown block 20. Further, a configuration of the first crown block 10 described basically above can be applied to the second crown block 20. A further desirable aspect of the second crown block 20 will be described below.

It is preferable that a maximum width W4 of the second crown block 20 in the tire axis direction is the same as a maximum width W1 of the first crown block 10 in the tire axis direction, or the maximum width W4 of the second crown block 20 is smaller than the maximum width W1 of the first crown block 10. The width W4 of the second crown block 20 of the embodiment is 0.50 to 1.00 times, preferably 0.70 to 0.90 times the width W1 of the first crown block 10. The second crown block 20 can be easily deformed more than the first crown block 10, and clogging of soil or mud between the first crown block 10 and the second crown block 20 can be suppressed.

Like the first crown block 10, the second crown block 20 has a wheel tread 20a, a first side surface 21 of the wheel tread 20a on the last-landing side in the rotational direction R, and a concave part 25 that opens on the wheel tread 20a and the first side surface 21. In addition, the second crown block 20 has a first edge 23 between the wheel tread 20a and the first side surface 21, and a second edge 24 between the wheel tread 20a and the concave part 25.

The first edge 23 of the second crown block 20 is inclined at an angle $\theta 5$ of 10 to 20° with respect to the tire axis direction. In a desirable aspect, the angle $\theta 5$ of the first edge 23 of the second crown block 20 is smaller than the angle $\theta 2$ (as shown in FIG. 4A) of the first crown block 10 with respect to the tire axis direction of the first edge 13. The second crown block 20 has an amount of deformation during braking different from that of the first crown block 10, clogging of soil or mud between the first crown block 10 and the second crown block 20 is suppressed, and good grip performance can be continuously exhibited.

The second edge 24 of the second crown block 20 is inclined at an angle $\theta 6$ of, for example, 5 to 15° with respect to the tire circumferential direction. In the desirable aspect, the angle $\theta 6$ of the second edge 24 of the second crown block 20 is desirably smaller than the angle $\theta 3$ of the second edge 14 of the first crown block 10 in the tire circumferential direction. The second edge 24 can suppress clogging of soil or mud in the concave part 25.

The wheel tread 20a of the second crown block 20 has an external corner part 26 having an angle θ7 of 90 to 100° between the first edge 23 and the second edge 24. The external corner part 26 can suppress the uneven wear.

The wheel tread 20a of the second crown block 20 has a first surface 28 and a second surface 29 that are separated from each other in the concave part 25. The first surface 28 and the second surface 29 of the second crown block 20 are fixed to, for example, a pentagonal edge.

As shown in FIG. 2, the first crown blocks 10 and the second crown blocks 20 are provided on the tire equatorial line C. In a desirable configuration, central positions of the first crown blocks 10 in the tire axis direction and central positions of the second crown blocks 20 in the tire axis direction are disposed on the tire equatorial line C. In another desirable configuration, the first crown blocks 10 and the second crown blocks 20 have a line-symmetrical shape with respect to the tire equatorial line C. The first crown blocks 10 and the second crown blocks 20 can exhibit good grip performance and abrasion resistance performance.

A middle sipe 33 that linearly extends is formed in the middle block 30. Further, in the specification, the "sipe" means a slit having a width of less than 1.5 mm.

In the embodiment, first middle blocks 31 and second middle blocks 32 are provided alternately in the tire circumferential direction. A first middle sipe 34 inclined in one direction with respect to the tire circumferential direction is formed in the first middle block 31. A second middle sipe 35 inclined in a direction opposite to the first middle sipe 34 is formed in the second middle block 32. The first middle block 31 and the second middle block 32 can be easily deformed in different directions, and suppress soil or mud from remaining in the vicinity of the middle regions Mi.

For example, a shoulder sipe 43 is desirably formed in the shoulder block 40. The shoulder sipe 43 has a substantially annular shape in which one end and the other end are in communication with one edge.

In the embodiment, first shoulder blocks 41 and second shoulder blocks 42 are provided alternately in the tire circumferential direction. The first shoulder block 41 has an edge inclined in the same direction as the first middle sipe 34, and both ends of the shoulder sipe 43 are in communication with the edge. The second shoulder block 42 has an edge inclined in the same direction as the second middle sipe 35, and both edges of the shoulder sipe 43 are in communication with the edge. The first shoulder block 41 and the second shoulder block 42 are deformed easily in different directions, and soil or mud can be suppressed from maintaining in the vicinity of the shoulder regions Sh.

As described above, while a desirable configuration of the tire for a motorcycle for uneven ground traveling according to the disclosure has been described in detail, the disclosure is not limited to the aforementioned specific embodiment and various modifications may be made.

EXAMPLE

Figure 6:
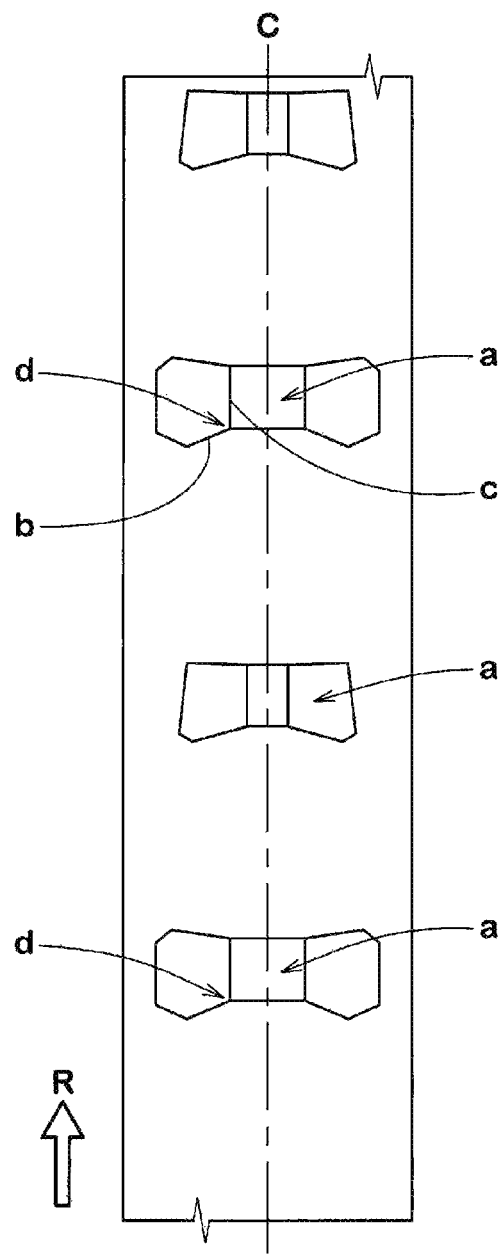
FIG. 6 is an enlarged view of a crown region for a tire for a motorcycle for uneven ground traveling of a comparative example.

A front wheel tire for a motorcycle for uneven ground traveling having a basic pattern in FIG. 2 was fabricated based on specifications in Table 1. As a comparative example, as shown in FIG. 6, a tire having an external corner part d having an angle that is an obtuse angle between a first edge b and a second edge c of a crown block a was fabricated. Further, the crown block a does not include an external corner part in which the angle is an acute angle. In addition, a tire of a comparative example has substantially the same tread pattern as that shown in FIG. 2, except for the above-mentioned matters. The grip performance of test tires and persistence of the grip performance were tested. Common specification or test methods of test tires are as follows.

Used vehicle: exhaust volume 450 cc, motorcross race vehicle
Tire size: 80/100-21
Rim size: 1.60×21
Internal pressure: 80 kPa
Test methods are as follows.

<Grip Performance>
In the vehicle, grip performance when the motorcycle travels on uneven ground including a large amount of mud was estimated according to a test rider's sense. In the results, scores are provided using a comparative example as 100, and better grip performance is exhibited as numerical values are increased.

<Persistence of Grip Performance>
In the vehicle, persistence of grip performance when the motorcycle travels on uneven ground including a large amount of mud was estimated according to a test rider's sense. In the results, scores are provided using the comparative example as 100, and persistence of grip performance at which mud cannot be easily clogged in the concave part was represented as good as numerical values are increased. Test results are represented in Table 1.

TABLE 1

|  | Comparative example | example | | | | | | | | |
| --- | --- | --- | --- | --- | --- | --- | --- | --- | --- | --- |
|  |  | 1 | 2 | 3 | 4 | 5 | 6 | 7 | 8 | 9 |
| Drawing showing crown region | FIG. 6 | FIG. 2 | FIG. 2 | FIG. 2 | FIG. 2 | FIG. 2 | FIG. 2 | FIG. 2 | FIG. 2 | FIG. 2 |
| Angle θ1 (°) of external corner part | 114 | 85 | 85 | 85 | 85 | 85 | 85 | 85 | 85 | 85 |
| Depth d1 of concave part/height h1 of first crown block | 0.45 | 0.45 | 0.35 | 0.40 | 0.50 | 0.55 | 0.45 | 0.45 | 0.45 | 0.45 |
| Maximum width W3 of concave part/width W1 of first crown block | 0.33 | 0.45 | 0.45 | 0.45 | 0.45 | 0.45 | 0.35 | 0.40 | 0.50 | 0.55 |
| Grip performance (score) | 100 | 103 | 100 | 102 | 103 | 104 | 101 | 102 | 103 | 104 |
| Persistence of grip performance (score) | 100 | 106 | 106 | 106 | 105 | 103 | 106 | 106 | 106 | 104 |

As will be apparent from Table 1, it has been confirmed that the tires of the examples continuously exhibit good grip performance.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A tire for a motorcycle for uneven ground traveling, comprising:
   a tread part, a plurality of crown blocks being formed thereon,
   wherein at least one of the plurality of crown blocks has:
      a wheel tread,
      a first side surface disposed at one side of the wheel tread in a tire circumferential direction,
      a first edge arranged between the wheel tread and the first side surface,
      a concave part that opens on the wheel tread and the first side surface, a depth of the concave part is smaller than a height of the at least one of the plurality of crown blocks, and a width of the concave part in a tire axis direction is gradually increased from the first side surface, and
      a second edge arranged between the wheel tread and the concave part,
      a third edge arranged between the wheel tread and a second side surface,
      the wheel tread has a first surface and a second surface separated from each other by the concave part, and the first surface and the second surface are respectively surrounded by an irregular hexagon including the first edge, the second edge and the third edge,
   the wheel tread has at least one external corner part in which an angle between the first edge and the second edge is an acute angle,
      an angle of the first edge with respect to the tire axis direction is 60° or less,
      an angle of the third edge with respect to the tire axis direction is 50° or less,
      a rotational direction of the tire is specified, and the first side surface is disposed on a last-landing side of the wheel tread in the rotational direction.

2. The tire for a motorcycle for uneven ground traveling according to claim 1, wherein the first side surface is curved to be recessed toward the other side of the wheel tread in the tire circumferential direction in a plan view of the tread part.

3. The tire for a motorcycle for uneven ground traveling according to claim 2, wherein the at least one of the plurality of crown blocks has the second side surface disposed on the other side of the wheel tread in the tire circumferential direction, and
   the concave part also opens on the second side surface.

4. The tire for a motorcycle for uneven ground traveling according to claim 3, wherein the second side surface is curved to be recessed toward the one side of the wheel tread in the tire circumferential direction in a plan view of the tread part.

5. The tire for a motorcycle for uneven ground traveling according to claim 4, wherein a width of the concave part on the second side surface in the tire axis direction is larger than a width of the concave part on the first side surface in the tire axis direction.

6. The tire for a motorcycle for uneven ground traveling according to claim 3, wherein a width of the concave part on the second side surface in the tire axis direction is larger than a width of the concave part on the first side surface in the tire axis direction.

7. The tire for a motorcycle for uneven ground traveling according to claim 2, wherein a hexagonal edge has a minimum edge length that is 0.15 times or more a maximum edge length.

8. The tire for a motorcycle for uneven ground traveling according to claim 2, wherein the angle between the first edge and the second edge is 80° or more.

9. The tire for a motorcycle for uneven ground traveling according to claim 2, wherein the depth of the concave part is 0.10 to 0.80 times the height of the at least one of the plurality of crown blocks.

10. The tire for a motorcycle for uneven ground traveling according to claim 1, wherein the at least one of the plurality of crown blocks has the second side surface disposed on the other side of the wheel tread in the tire circumferential direction, and
    the concave part also opens on the second side surface.

11. The tire for a motorcycle for uneven ground traveling according to claim 10, wherein the second side surface is curved to be recessed toward the one side of the wheel tread in the tire circumferential direction in a plan view of the tread part.

12. The tire for a motorcycle for uneven ground traveling according to claim 11, wherein a width of the concave part on the second side surface in the tire axis direction is larger than a width of the concave part on the first side surface in the tire axis direction.

13. The tire for a motorcycle for uneven ground traveling according to claim 10, wherein a width of the concave part on the second side surface in the tire axis direction is larger than a width of the concave part on the first side surface in the tire axis direction.

14. The tire for a motorcycle for uneven ground traveling according to claim 1, wherein a hexagonal edge has a minimum edge length that is 0.15 times or more a maximum edge length.

15. The tire for a motorcycle for uneven ground traveling according to claim 1, wherein the angle between the first edge and the second edge is 80° or more.

16. The tire for a motorcycle for uneven ground traveling according to claim 1, wherein the depth of the concave part is 0.10 to 0.80 times the height of the at least one of the plurality of crown blocks.

* * * * *